United States Patent [19]
Carter et al.

[11] 3,942,746

[45] Mar. 9, 1976

[54] AIRCRAFT HAVING IMPROVED PERFORMANCE WITH BEAVER-TAIL AFTERBODY CONFIGURATION

[75] Inventors: Glenn T. Carter; Thomas F. Paniszczyn, both of Fort Worth, Tex.

[73] Assignee: General Dynamics Corporation, Fort Worth, Tex.

[22] Filed: Oct. 1, 1973

[21] Appl. No.: 402,540

Related U.S. Application Data

[63] Continuation-in-part of Ser. No. 212,180, Dec. 27, 1971, abandoned.

[52] U.S. Cl. ............... 244/13; 244/36; 244/110 D; 244/113
[51] Int. Cl.² .......................................... B64C 1/00
[58] Field of Search ......... 244/36, 46, 13, 34 R, 40, 244/41, 42 D, 42 DA, 42 DC, 45 R, 119, 110 D, 113, 120, 124; D12/71

[56] References Cited
UNITED STATES PATENTS

| 1,167,874 | 1/1916 | Backus................................ 244/36 |
| 2,222,187 | 11/1940 | Weatherbee.................. 244/42 DA |
| 2,612,329 | 9/1952 | Crandall et al................. 244/42 DC |
| 2,723,091 | 11/1955 | Davis et al....................... 244/42 D |
| 3,130,944 | 4/1964 | Creasey et al..................... 244/124 |
| 3,576,300 | 4/1971 | Palfreyman........................... 244/36 |
| D196,343 | 9/1963 | Norman.............................. D12/71 |

OTHER PUBLICATIONS

W. K. Greathouse, Blending Propulsion with Airframe, Nov. 1968, pp. 59–68 of *Space and Aeronautics*.
Jane's All the World's Aircraft, 1964–1965, pp. 249–250 "Lockheed YF–12A."
Jane's All the World's Aircraft, 1971–1972, pp. 84,86, and 315–316, "Grumman Tomcat."
*Space and Aeronautics*, Aug. 1969, p. 19, "F–14A mockup."
*Space and Aeronautics*, Mar. 1971, p. 34, (Ad showing F–14).
*Aviation Week and Space Technology*, Jan. 4, 1971, "Air Force Studies F–14 Interceptor Buy" pp. 17–18.
*Aviation Week and Space Technology*, Feb. 1, 1971, (Inside Cover).
*Flight International*, Jan. 20, 1966, pp. 96–97 "Lockheed L-2000".

*Primary Examiner*—Trygve M. Blix
*Assistant Examiner*—Galen L. Barefoot
*Attorney, Agent, or Firm*—Charles E. Schurman; John R. Duncan; Charles C. M. Woodward

[57] ABSTRACT

An aircraft having a composite configuration comprising a conventional fuselage forebody portion which symmetrically and variformly blends into a relatively wide, substantially flat beaver-tail-like afterbody, with the afterbody having an integral pitch trimming camber and a composite pitch control device and air brake, hinged transversely thereacross and forming at least a part of its trailing edge. The beaver-tail afterbody is geometrically blended into and joined with the after portion of the conventional forebody through the medium of an intervening medial body defined by a geometric transition piece. The composite aircraft is further capable of fixedly accommodating any type of conventional wing configuration without the necessity for any adaptative, structural change or modification and also carries conventional propulsion units and control surface components.

14 Claims, 12 Drawing Figures

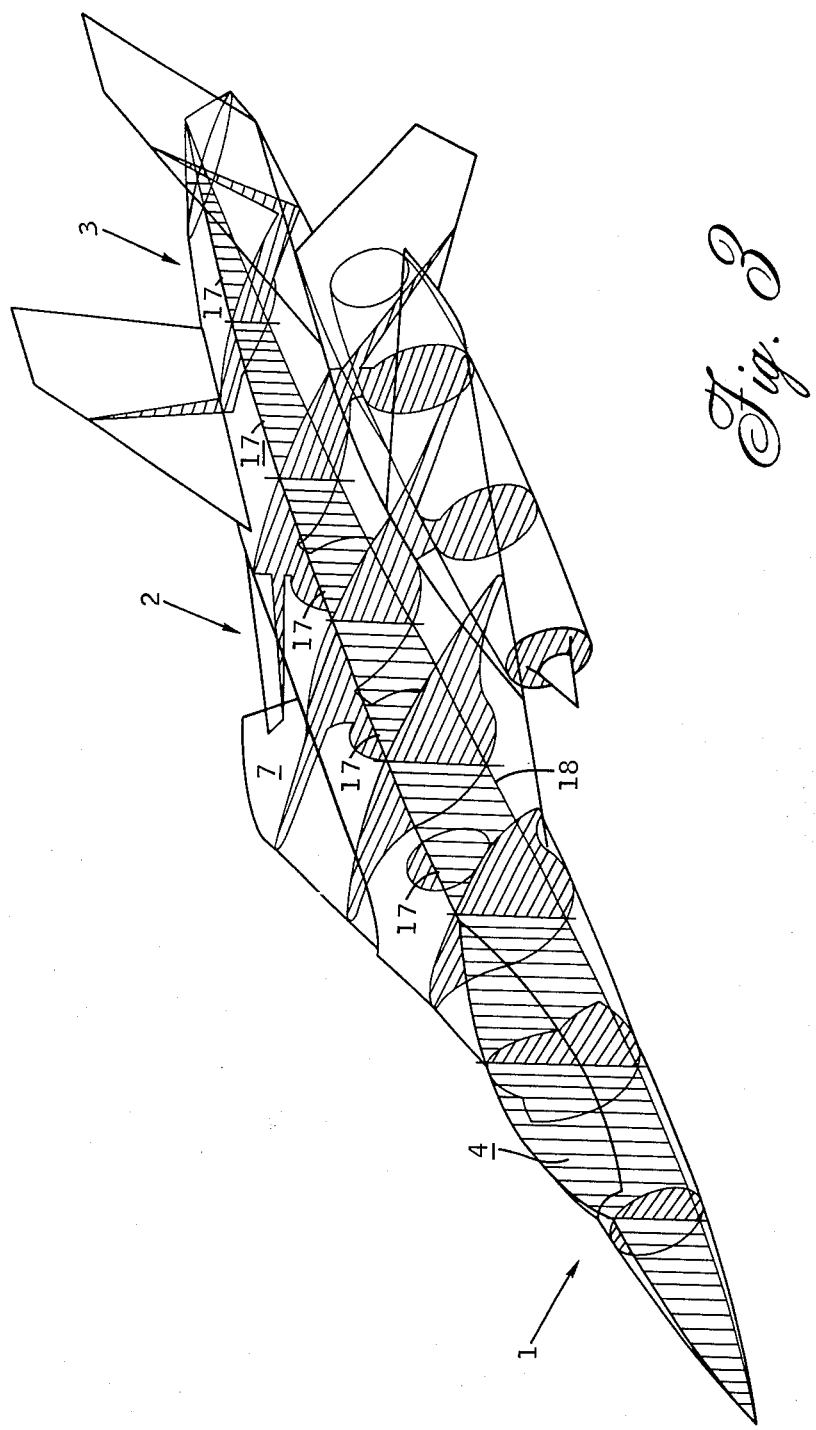

AIRCRAFT HAVING IMPROVED PERFORMANCE WITH BEAVER-TAIL AFTERBODY CONFIGURATION

CROSS REFERENCE TO RELATED APPLICATIONS

This is a continuation-in-part of our copending application Ser. No. 212,180, filed Dec. 27, 1971, now abandoned.

BACKGROUND OF THE INVENTION

This invention relates to improvements in aircraft design configuration and related operational functions primarily in the supersonic flight regimes (Mach I and above).

Until the present, conventional, tapering, conical boat-tail shapes generally formed the afterbody of aircraft. A typical afterbody of the known art is illustrated in U.S. Pat. 3,447,761 and also in U.S. Pat. 3,076,625. Several disadvantages are inherent in the conventional conical boat-tail shapes, especially when the engines are buried, or housed within the fuselage afterbody, forming bulky, aero-dynamically inefficient, postern profiles and particularly between engines in multi-engine aircraft. The aerodynamic problems associated with the postern profile of conventional aircraft are especially deleterious and complex in the supersonic speed regimes. The problem is even more severe if the nozzles of the buried engines emerge from the fuselage. At supersonic speeds flow separation occurring from the aft fuselage surface contours and the highly converging surfaces between the emerging engine nozzles increases the postern or wake drag of the aircraft and is significantly detrimental to its performance. This base drag, induced by the conical boat-stern-like aft end of a conventional fuselage, is very detrimental to the performance of aircraft, particularly during supersonic flight.

High fineness ratio which is derived by dividing the length of the fuselage by its maximum equivalent diameter presently necessitates use of exceptionally long fuselages which are required in order to reduce the conical boatstern drag effect at transonic and supersonic speeds. Complete elimination of such base drag is a highly sought for objective by those skilled in the art of designing high performance aircraft. Additional lengthening of the fuselage for the purpose of achieving a high fineness ratio is not feasible since increased wetted area drag results therefrom. Wetted area drag is also detrimental to the achievement of efficient transonic and supersonic performance as is trim drag induced by conventional devices for the necessary trimming out the airplane against pitching moment.

SUMMARY OF THE INVENTION

The prime object, therefore, of this invention is to improve aircraft performance and controllability by symmetrically blending and variformly transforming the fuselage from a forward portion of conventional configuration into a wide, flat, airfoil-like afterbody hereinafter referred to as a beaver-tail afterbody with a laterally hinged composite air brake and pitch control device embodied in and forming at least a portion of its trailing edge. Spanwise separation of the buried engines in the afterbody is achieved and the composite air brake and pitch control device, integrally embodied in the trailing edge of the beaver-tail, achieves a very significant improvement in the efficiency of aircraft's performance by substantially eliminating back-end, postern or wake drag, further a very salient improvement in maneuverability, is also realized.

The above object, and others, are accomplished, by an aircraft having any desired conventional forebody configuration which is variformly and symmetrically blended, through the medium of an intervenient transitional piece, into a wide, flat, airfoil-shaped afterbody or beaver-tail having an integral composite air brake and pitch control device hinged transversely across the beaver-tail and embodied therein and also forming at least a portion of its trailing edge. The invention is capable of being used in conjunction with several wing configurations to include, but not necessarily limited to, the following: (1) The fixed, transverse span wing type, (2) the fixed delta wing type, (3) the variable, sweep wing type, (4) or with control surfaces that generally comprise the aft empennage assembly or elevons, twin vertical fins, and with strut attached engine nacelles.

The invention is thus characterized as an improved composite aircraft which comprises, in combination, a conventional forebody, a beaver-tail afterbody having zero base drag to aerodynamically enhance aircraft performance, a transitional piece or body component capable of receiving and fixedly accommodating without design change or modification thereof, any conventional type wing, a composite air brake and pitch control device, defining at least a portion of the trailing edge thereof, which is rotatably integral with beaver-tail afterbody and when appropriately cambered 25, FIG. 11, is an effective trimming device and redundant aerodynamic pitch control instrumentality while also providing an optimum longitudinal center line location for the dual acting aerodynamic air brake which is also incorporated therein. Locating the composite air brake and pitch control device at the extreme aft end of the aircraft requires only minimal trim change and achieves minimal interference and buffeting effects and also provides a design option for incorporating an airfoil aftbody camber to achieve the desired zero-lift pitching moment for minimal trim drag and increased maneuver control power. The invention has a relatively flat, wide undersurface permitting the mounting of external weapons and stores, and further provides a wide body paddle type area for improved aerodynamic pitch damping and for a further rearward center of body lift location, and a unique design for achieving a more nearly ideal cross-section area distribution for improved performance.

BRIEF DESCRIPTION OF THE DRAWINGS

The details of the preferred embodiments of the present invention will be further understood upon reference to the drawings, wherein:

FIG. 3 is an isometric view of an aircraft embodying the concept of the present invention and exemplifies geometric cross-sectional development of transition piece configurations from that of a circular cross-section nose segment into that of a substantially flat, wide, airfoil-like afterbody of beaver-tail aspect and constituting the composite body's trailing edge portion and further illustrates the airfoil-like cross-section of the central transition piece and beaver-tail afterbody;

DETAILED DESCRIPTION OF THE INVENTION

Figure 1:
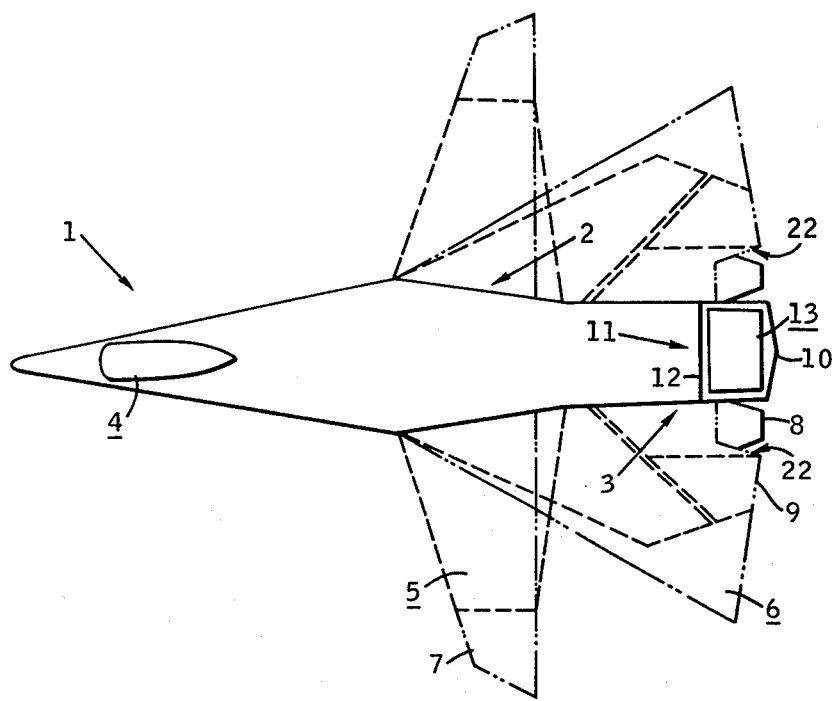
FIG. 1 is a simplified composite plan view of the aircraft winged configurations, effected by respectively super-imposing one wing type upon the other, and graphically shows, by a solid line delineation, the total, detachable and separately intact structural fuselage, having a novel, wide afterbody of beaver-tail aspect and, by broken line delineation, the wing and tail components, together with affixed propulsion elements.

Referring now to FIG. 1, there is seen a simplified composite plan view of the invention as it would appear with aircraft having forebodies 1 of conventional cross-section and respective medial body transition pieces 2, wherein the cross-sectional configuration of the conventional forebody 1 is aerodynamically faired into the cross-sectional configuration or afterbody 3, which is of substantially airfoil segment configuration 17, FIG. 3, by geometric development of an intervenient transition piece which defines a medial body segment 2, thus variformly and symmetrically blending said forebody 1, into a wide, flat planform or planar afterbody 3; conventional crew compartments 4 being embodied in the fuselage forebodies 1 in the usual manner.

The term "transition piece" is a drafting or geometric phrase-of-the-art which is employed in substantially all college-level textbooks which treat of geometry per se or of the geometry of drafting. Reference is made, for exemplary showing, to the well known, widely employed textbook entitled GRAPHIC SCIENCES (2nd Edition) by Thomas E. French and Charles J. Vierck, McGraw-Hill Book Company, Inc., New York, N.Y.; Library of Congress Card No. 62-20995-22302; with specific reference being made to Paragraph 18-42 and to FIGS. 18.46 through 18.49 thereof.

In its various constructional forms the invention may be selectively embodied separately or in combination with conventional prime lifting surfaces or wings of various types, such as with a fixed span wing 5, a delta wing 6, a swept or variable geometry wing 7 and/or with a single or plurality of propulsion units 8. Further combinations include conventional aft empennage assemblies 22, or elevons in the case of tailless delta wing 6, preferably each having twin vertical fins and strut appended engine nacelles 8, as shown. The combination includes the wide planform afterbody fuselage 3 with the upper and the lower afterbody contour surfaces tapering to define an airfoil trailing edge 10 and having a movably integrated composite air brake 13 and auxiliary elevator or pitch control 11 device angularly deflective about lateral hinge line 12. A salient feature of the present invention is the inherent simplicity of the foregoing arrangement of a wide airfoil section beaver-tail aft end body 3 and an integral, deflective pitch control device 11 which when normally constringed augments pitch control and pitch trim in cooperation with conventional horizontal tail surface 9 for the variable sweep wing embodiment and the conventional fixed wing embodiment; the same pitch effect is made in cooperation with elevons, however, in the tailless delta wing aircraft embodiment 6. In the event the aforementioned conventional horizontal tail 9 or elevon should become inoperative during flight, the composite air brake 13 and pitch control 11 device, significantly enhances aircraft survivability and reliability when employed as a back-up, adjunctive aerodynamic control device. This is accomplished through the use of the pitch control elements of the device 11 to provide adequate pitch control and pitch trim, thus affording a margin of difference between crashing the aircraft and safely landing it.

Figure 2A:
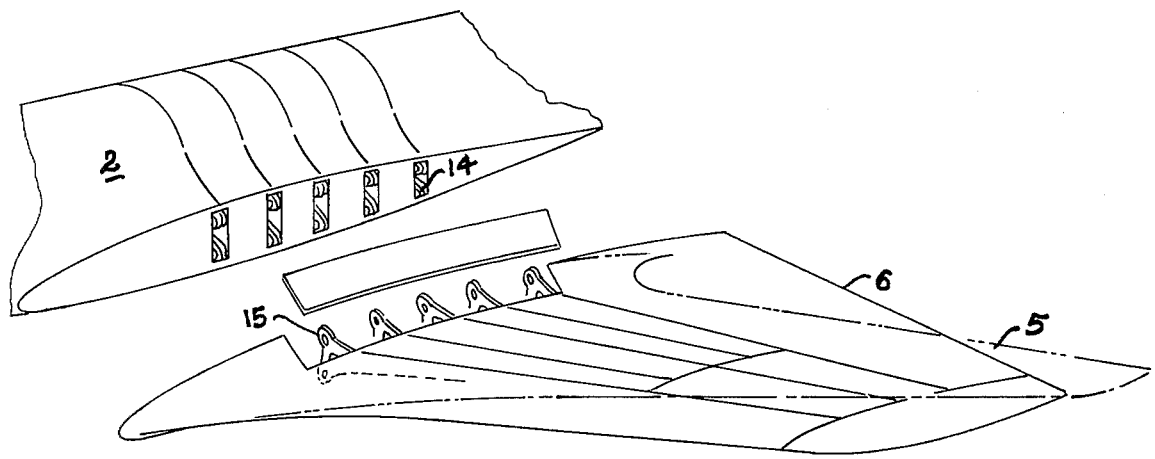
FIG. 2A shows a common fixed fitting means of attachment for wings having various planform geometries.
Figure 2B:
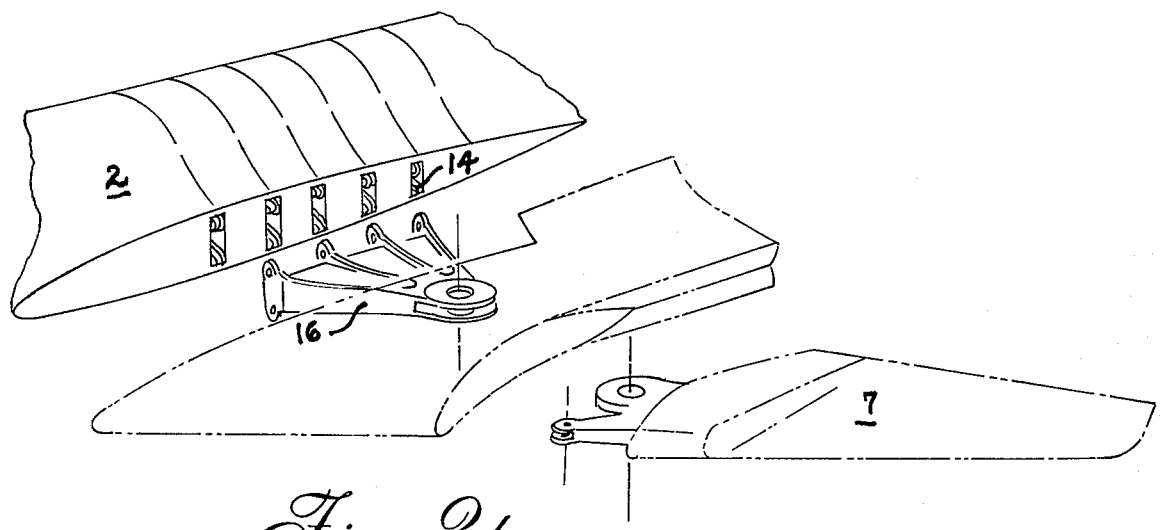
FIG. 2B illustrates means for attaching a variable sweep wing with provision of an adaptor fitting that permits cooperative use of the common fuselage fitting attachment shown in FIG. 2A.

As seen in FIGS. 2A and 2B this invention can be used in conjunction with a variety of prime lifting surface or wing types. FIG. 2A shows the fuselage transition piece 2 and the fuselage bulkhead end fittings 14 to which can be attached a fixed span type wing 5 or a delta type wing 6 through the medium of end fittings 15 located on the spars of the wings. The fuselage bulkhead spacing is aligned with the corresponding wing spars which also have fittings 15 which are bolted or otherwise fixedly attached to their corresponding fuselage fittings 14. This type of wing attachment will accommodate all wing types, including any of a given type even though differing in planform geometry. FIG. 2B shows the fuselage transition piece 2 and the fuselage bulkhead end fittings 14 to which can be attached an adaptor fitting element 16 which adapts fuselage body section 2 to a single point of attachment for operably accommodating variable sweep wing 7.

The true airfoil shape of afterbody 3 eliminates back end or base drag and effects significantly improved performance in the range, speed and acceleration of the invented aircraft. The configuration shown in FIG. 1 with podded or semi-podded engines 8 and twin vertical tails 22 allows the integral incorporation into the trailing edge 10 of beaver-tail afterbody 3, a unique, composite air brake 13 and pitch control device 11, pivotal about hinge line 12. The beaver-tail shape of the afterbody 3 itself improves aircraft reliability and survivability by being functionally redundant with the horizontal tail. The composite air brake 13 and pitch control device 11 when constringed and used for pitch control by angular deflection about hinge line 12 and used in combination with the horizontal tail 9 effects significantly improved pitch response and maneuverability. Use of the beaver-tail's pitch control element 11 in combination with the horizontal tail 9 or with elevons maintains a low pitch trim deflection so that trim drag is reduced and resultant in improved performance. Aircraft instantaneous maneuver "g" capability is significantly improved by the greatly increased tail or elevon deflection available above the trim deflection. The beaver-tail pitch control element 11 of the device assumes primary responsibility for pitch control and pitch trim thus freeing the horizontal tail 9 or elevons to provide additional differential roll control.

Figure 11:
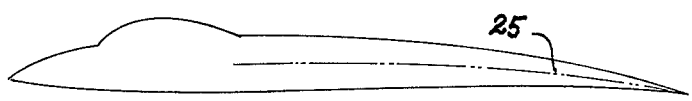
FIG. 11 is similar to FIG. 10 with the exception that it is exemplary of the trailing edge's cross-sectional camber when the object aircraft composite is intended to be operated primarily in its supersonic regime.

The wide airfoil afterbody 3 also lends itself readily to incorporation, when desired, of controlled body camber indicated by 25 of FIG. 11. The body camber 25, when employed, provides the desired level of positive aerodynamic zero lift pitching moment for minimum trim drag. Excellent reserve maneuver control power becomes available as a result of such capability.

Figure 9:
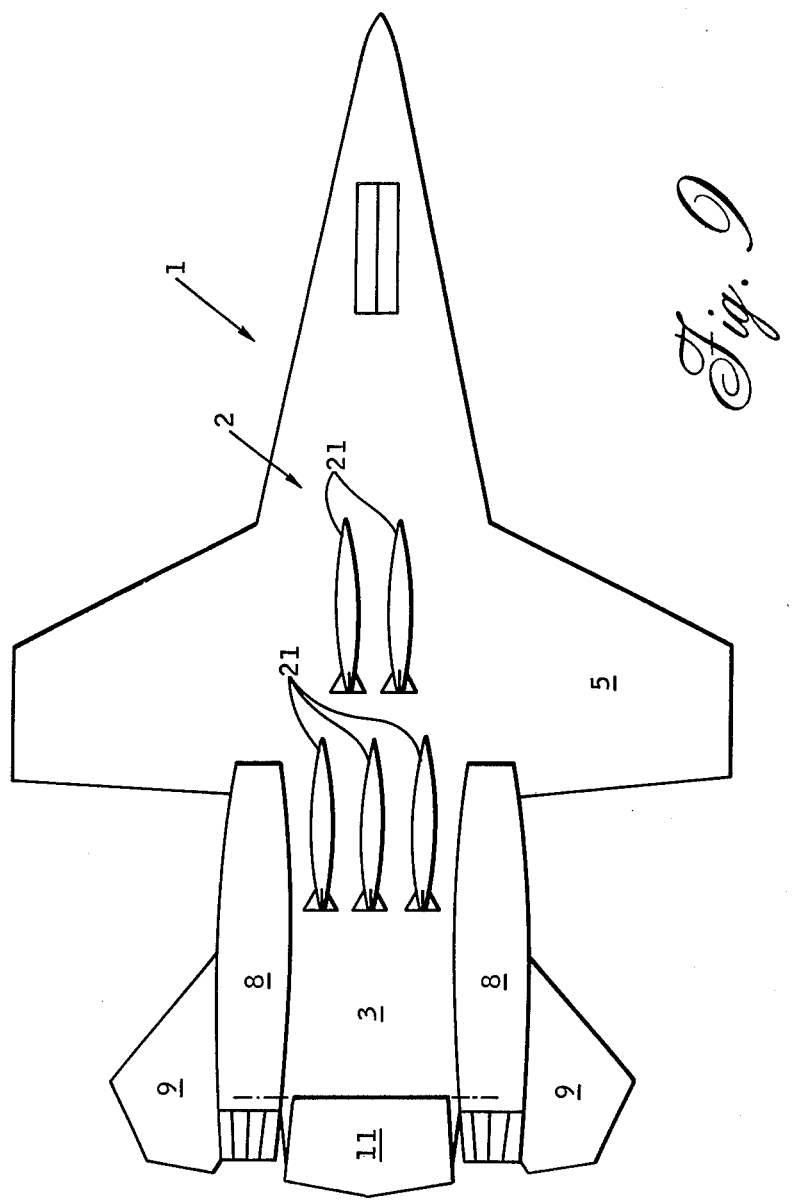
FIG. 9 is a bottom plan view of an aircraft embodying the invention and particularly illustrates its attributes in respect to the mounting of internal weapons and/or stores thereon.

The relatively flat, wide undersurface of the afterbody 3 shown in FIG. 9 serves as an ideal attachment surface for optimum mounting of external weapons and/or stores 21 near the center line of the longitudinal axis in lieu of conventional mounting spanwise on the wing, thereby considerably enhancing both the static and dynamic stability of the aircraft. Mounting of stores 21 near the aircraft's longitudinal axis of symmetry results in reduced roll inertia thereby effecting improved roll control response. Resultant separation and launch reactions from such weapons and/or stores from the afterbody is much less malefic than that resultant from wing mounted stores because more favorable flow fields exist at the afterbody location than at the wing spanwise mounting positions. The afterbody mounting also permits the weapons and/or stores to be semi-submerged with attendant reduced drag and improved performance of the aircraft.

The wide, flat afterbody 3 forms paddle-like planar surfaces which serve to provide much greater inherent aerodynamic pitch damping when compared to that resultant from a conventional, conical, relatively narrow fuselage afterbody. Similarly, such a wide, flat afterbody provides a more favorable aft location of the center of pressure for the component of lift contributed by the body. This more favorable location of the aft center of pressure permits utilization for fuel of aft volume space provided by the wide afterbody 3.

The wide afterbody 3 also permits tailoring of the area distribution in such manner as to most efficiently obtain favorable minimal maximum cross-sectional area and favorable variation in the aft slopes of area distribution in order to realize improved performance through improved drag characteristics.

Figure 4:
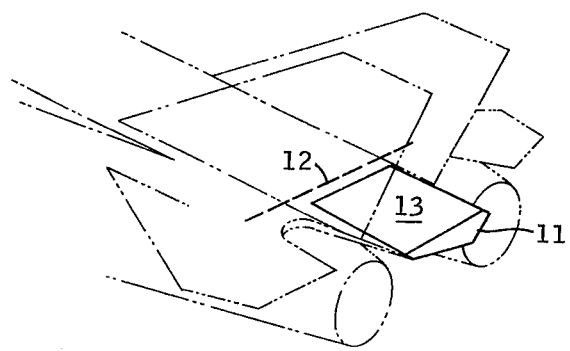
FIG. 4 is a rear perspective view of the empennage affixed afterbody and particularly illustrates the trailing edge of the beaver-tail and afterbody of the composite air brake and pitch control device embodied therein in a neutral and fully constringed mode.
Figure 5:
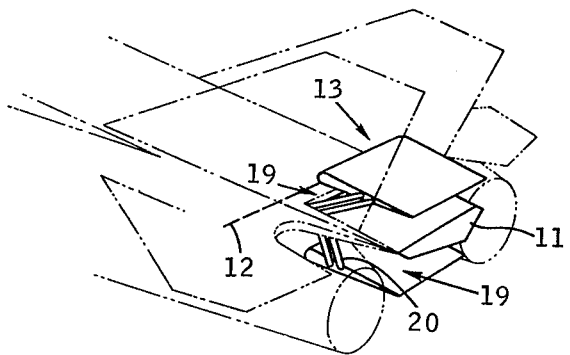
FIG. 5 is similar to FIG. 4 but also illustrates the mechanical details of the trailing edge of the beaver-tail with its composite dual element air brake component horizontally displaced in the first phase of its dual phase operation and also exemplifies the dual duct-like airstream passages resultant therefrom.
Figure 6:
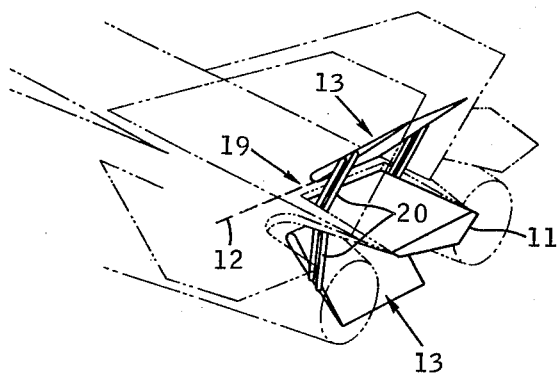
FIG. 6 is similar to FIG. 5, but more perspicuous than the latter in that it shows the dual element air brake components or panels angularly disposed above and below the beaver-tail surface in a full braking mode of operation.

Referring now to FIGS. 4, 5 and 6 composite air brake 13 and pitch control device 11 are illustrated in their dual phase operation. FIG. 4 illustrates the neutral position of the device and its location on the trailing edge of the beaver-tail afterbody 3. In such neutral position the composite device operates to control pitch but does not operate as an air brake. FIG. 5 shows the composite air brake 13 and pitch control 11 device in operation with the air brake 13 in an extended position permitting a continuous air flow 19 between the air brake surfaces 13 and the pitch control surface 11. In this position pitch control can be maintained by angular rotation of the pitch control surface 11 about hinge line 12. FIG. 6 shows the composite air brake 13 and or auxiliary elevator pitch control 11 device in operation and performing its dual function. The air brakes 13 have been applied through the use of the mechanical linkage 20 and are in an angular position in relation to the afterbody 3. The pitch control function is simultaneously achieved by deflecting the pitch control surface 11 slightly while a continuous air flow 19 is achieved by the separation of the air brake surfaces 13 from the pitch control surface 11. Since the composite air brake 13 and pitch control device 11 is located at the extreme aft end of the aircraft composite, exposure of the airframe to the turbulent air flow downstream of the device is minimal. By allowing the continuous air flow 19 when the air brakes 13 are in operation, the air turbulence is greatly reduced and structural vibration is greatly minimized during the operation of the air brakes 13.

Figure 7:
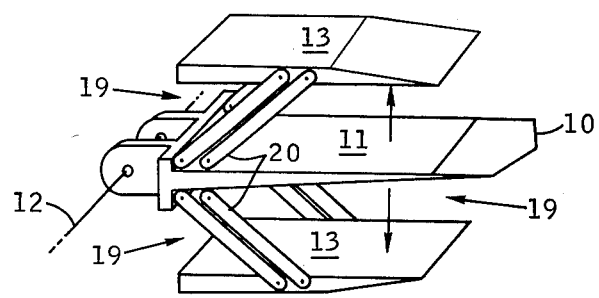
FIG. 7 is a detailed perspective view of the preferred mechanical linkage system employed in the invention for vertically displacing and then angularly disposing the air brake elements or panels shown in FIGS. 4, 5 and 6, as viewed during the first phase or vertically displaced position during its dual phase operation.
Figure 8:
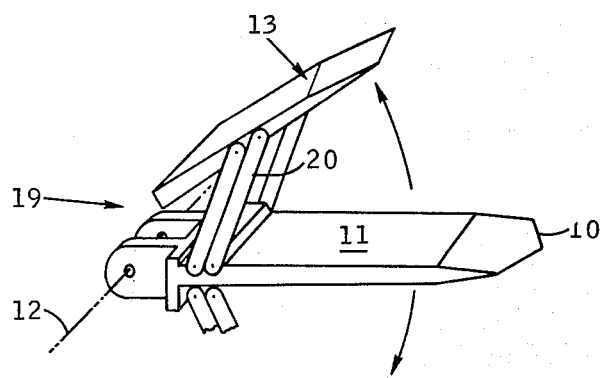
FIG. 8 is a partial view similar to FIG. 7 but shows the upper segment brake element linkage when such element is angularly disposed during phase two of the braking operation.

The composite air brake 13 and pitch control 11 device is further shown in detail in FIGS. 7 and 8. In FIG. 7 a detailed perspective view of the preferred four bar mechanical linkage system 20 employed for vertically displacing and then angularly disposing the air brake elements 13 is shown during the first phase or vertically displaced position during its dual phase operation. The separation of the air brake elements or panels 13 from the pitch control element 11 allows a continuous air flow 19 to reduce air turbulence and enhance aircraft maneuverability. FIG. 8 is a partial view similar to FIG. 7 but shows the upper segment's air brake element 13 linkage 20 when such element is angularly disposed during phase two of the braking operation. Even at this stage in the operation of the composite air brake 13 and pitch control 11 device, a continuous air flow 19 is maintained which allows the use of the pitch control element 11 to control pitch even while the air brakes 13 are in operation.

Figure 10:
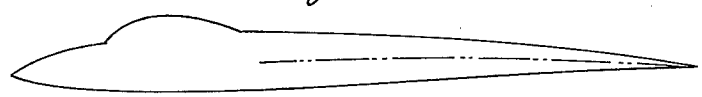
FIG. 10 is an enlarged profile configuration of the present beaver-tail afterbody's trailing edge and is exemplary of its cross-sectional camber when the object aircraft composite is intended to be primarily operated in its subsonic regime.

Pitch control is accomplished by rotating the entire assembly about hinge line 12, with air brake surfaces 13 closed against surface 11 or in any other position such as those shown in FIGS. 7 and 8. With the control assembly closed, the pitch control may effectively reshape the after fuselage as schematically shown in FIGS. 10 and 11. Any suitable means may be used for rotating the assembly about hinge line 12 under pilot control. Any conventional hinge having structural integrity, such as that shown in U.S. Pat. No. 2,445,399, may be used.

Any suitable conventional mechanical linkage, such as that shown in U.S. Pat. No. 2,511,446, may connect the pitch control and air brake assembly to a cockpit control. Alternatively, a conventional electrical motor may be directly connected to the control assembly, with a control switch at the cockpit. Similarly, any conventional control linkage or system, such as those shown in U.S. Pat. Nos. 3,486,720; 3,243,148 or 2,723,091, may be used to move air brake elements 13 among the various positions illustrated.

Preferably, wing attachments are effected by the employment of multifurcated clevis fittings 14, FIG. 2A, having sufficient structural integrity to provide the capability for safely transferring all aerodynamically induced loads from the prime structure of the wing. Such transfer is from spars, as shown, or as the case may be, from a structural box section of the wing, into the prime structure of the body to which it is attached, for example, to longerons, bulkheads as shown, or beltframes; such multifurcated fittings being rigidly interlocked by means of a conventional pinned-clevis nexus into corresponding multifurcated adaptor fittings of similar structural integrity, which are affixed to and carried by the root section of the object wing.

It will be appreciated that typically in an aircraft fuselage the forebody component extends from the aircraft nose aft to about the area of attachment of the forward portion of the wing structure to the fuselage; the intervenient body component extending therefrom aft to about the area of attachment of the rear portion of the wing to the fuselage; and the afterbody component extending therefrom aft to the rearmost edge or tip of the fuselage. It also will be understood herein that transverse or longitudinal camber refers to curvature in an amount represented by the deviation between the mean line between upper and lower surfaces and a chord connecting the dimensional extremes, e.g., longitudinally or transversely of the fuselage such camber to be seen in FIG. 3.

Other ramifications, variations and applications of the present invention will become apparent to those skilled in the art. These are intended to be included within the scope of this invention as defined in the following claims.

We claim:

1. In a supersonic aircraft having propulsion means, stabilizer fin means and a supersonic configuration fuselage provided with wings extended to opposite sides thereof, the improved fuselage that has a longitudinally and transversely cambered airfoil configuration of high fineness ratio in which the airfoil fuselage extends flat-like substantially continuously from the forebody portion of the fuselage to the trailing edge thereof which comprises:

a supersonically faired fuselage forebody component for accommodating the aircraft crew and for housing conventional apparatus and instruments for operation and control of the aircraft;

a fuselage afterbody component having a beaver-tail-like planform and a longitudinally cambered airfoil cross-sectional profile with a relatively wide, flat-like lateral cross-section for effecting optimum pitch trim while operating in a desired supersonic speed regime;

a fuselage intervenient body component adapted for attachment of aircraft wings thereto and having a longitudinally cambered airfoil cross-sectional profile with a generally flat-like lateral cross-section that flattens progressively from the forebody component towards the rear of the aircraft so as to aerodynamically blend and fair said forebody into said afterbody;

said fuselage forebody component extending from the aircraft nose to about the area of attachment of the forward portion of the wing structure to the fuselage; the intervenient body component extending therefrom aft to about the area of attachment of the rear portion of the wing to the fuselage; and the afterbody component extending therefrom aft to the rearmost edge or tip of the airplane fuselage;

said fuselage intervenient and afterbody components having upper and lower surfaces together forming a substantially smoothly continuous airfoil section extending continuously from said forebody component to the trailing edge of said afterbody component, the upper surface of the fuselage intervenient body component extending as a flat-like substantially constant transverse curvature throughout substantially the full longitudinal extent of the intervenient body component and at least a portion of said afterbody component;

attachment means carried by said intervenient body component for affixing aircraft wing structure thereto so as to extend on opposite sides thereof;

said forebody component, intervenient body component and afterbody component forming an airfoil configured high fineness ratio fuselage that is both progressively flattened and longitudinally and transversely cambered in longitudinal cross-section substantially continuously from said forebody to said trailing edge, said fuselage afterbody component having the lateral edges thereof approximately parallel for the major portion of the length thereof;

whereby at supersonic speed drag resulting from wake turbulence from said fuselage afterbody is largely eliminated and aerodynamic force is gained from said fuselage independent of the aircraft wing structure to thereby reduce trim drag otherwise tending to slow the speed of the aircraft.

2. The fuselage of claim 1 in which the fineness ratio is from about 12 to about 16.

3. The fuselage of claim 1 in which said upper and lower surfaces are each longitudinally cambered in the same direction with respect to the depth of the fuselage throughout the major portion of said fuselage intervenient and afterbody components.

4. The fuselage of claim 1 in which the stabilizer fin means are dual stabilizing tail fins mounted at opposite sides of said fuselage afterbody component.

5. The fuselage of claim 4 in which the distance from the longitudinal centerline of said afterbody component to the inboard contour of propulsion means adjacent thereto is at least about one-half the planform width of said afterbody component.

6. The fuselage of claim 1 in which said upper surface has a smoothly continuous upwardly convex lateral curvature or camber extending substantially continuously from the fuselage forebody component to the area of the fuselage trailing edge.

7. The fuselage of claim 1 in which successive vertical longitudinal cross-sections thereof in profile from the fuselage longitudinal centerline vertical plane outward display substantially an airfoil configuration of progressively higher fineness ratio in directions laterally outward of said plane.

8. In a supersonic aircraft having propulsion means, stabilizer fin means and a supersonic configuration fuselage provided with wings extending to opposite sides thereof, the improved fuselage that has a cambered airfoil configuration of high fineness ratio in which the airfoil fuselage extends flat-like and is cambered substantially continuously from the forebody portion of the fuselage to the trailing edge thereof and defines a relatively wide flat-like afterbody portion having a transversely hinged auxiliary pitch control means forming the fuselage trailing edge comprising:

a supersonically faired fuselage forebody component for accommodating the aircraft crew and for housing conventional apparatus and instruments for operation and control of the aircraft;

a fuselage afterbody component having a beaver-tail-like planform and a longitudinally cambered airfoil cross-sectional profile with a relatively wide flat-like lateral cross-sectional for effecting optimum pitch trim while operating in a desired supersonic speed regime;

a fuselage intervenient body component adapted for attachment of aircraft wings thereto and having a generally flat-like lateral cross-section flattening progressively from the forebody component towards the rear of the aircraft so as to aerodynamically blend and fair said forebody into said afterbody, said fuselage forebody component extending from the aircraft nose to about the area of attachment of the forward portion of the wing structure to the fuselage; the intervenient body component extending therefrom aft to about the area of attachment of the rear portion of the wing to the fuselage; and the afterbody component extending therefrom aft to the rearmost edge or tip of the airplane fuselage;

the upper and lower surfaces of said fuselage intervenient and fuselage afterbody components forming a substantially smoothly continuous airfoil section extending continuously from said forebody component to the trailing edge of said afterbody component, the upper surface of the fuselage intervenient body component extending as a flat-like substantially constant transverse curvature throughout substantially the full longitudinal extent of the intervenient body component and at least a portion of said afterbody component attachment means carried by said intervenient body component for affixing aircraft wing structure thereto so as to extend on opposite sides thereof;

said forebody component, intervenient body component and afterbody component forming a high fineness ratio fuselage cambered longitudinally substantially continuously throughout said fuselage intervenient and afterbody components;

the rearmost portion of said afterbody component being hinged for movement about a line transverse thereof to form the fuselage trailing edge portion as an auxiliary pitch control means which can be angled up and down above and below the mean camberline of the fuselage forward of said line so as to alter fuselage longitudinal camber for control of aircraft trim and pitch.

9. The fuselage of claim 8 in which airbrake means is provided on said fuselage afterbody component in association with said auxiliary pitch control means, said airbrake means including upper and lower braking panels adapted to lie flat-like against outer-directed control surfaces of the pitch control means so as effectively to form at least a portion of the control surfaces thereof when in retracted position, and means for moving said panels away from said pitch control means into the airstream passing over said fuselage afterbody component to create an air flow passage between the panels and the pitch control means when the airbrake means is to be deployed.

10. The fuselage of claim 8 in which said braking panels extend substantially the width of said fuselage afterbody component at the location of said airbrake means.

11. The fuselage of claim 9 in which said pitch control means and said airbrake means are operatively disposed between dual propulsion units mounted on the aircraft.

12. In a supersonic aircraft having propulsion means, stabilizer fin means and a supersonic configuration fuselage provided with wings extending to opposite sides thereof, the improved fuselage that has a cambered airfoil configuration of high fineness ratio defining a relatively wide flat-like afterbody portion having a transversely hinged auxiliary pitch control means forming the fuselage trailing edge comprising:

A. a supersonically faired fuselage forebody component for accommodating the aircraft crew and for housing conventional apparatus and instruments for operation and control of the aircraft;

B. a fuselage afterbody component having a beaver-tail-like planform and a longitudinally cambered airfoil cross-sectional profile with a relatively wide flat-like lateral cross-section for effecting optimum pitch trim while operating in a desired supersonic speed regime;

C. a fuselage intervenient body component adapted for attachment of aircraft wings thereto and having a generally flat-like lateral cross-section flattening progressively from the forebody component towards the rear of the aircraft so as to aerodynamically blend and fair said forebody into said afterbody, upper and lower surfaces of said intervenient and afterbody components being substantially smoothly continuous airfoil surfaces from said forebody component to the trailing edge of said afterbody component;

D. attachment means carried by said intervenient body component for affixing aircraft wing structure thereto so as to extend on opposite sides thereof;

E. said forebody component, intervenient body component and afterbody component forming a high fineness ratio fuselage having longitudinal camber in said fuselage afterbody component;

F. the rearmost portion of said afterbody component being hinged for movement about a line transverse thereof to form the fuselage trailing edge portion as an auxiliary pitch control means which can be angled up and down above and below the mean camberline of the fuselage forward of said line so as to alter fuselage longitudinal camber for control of aircraft trim and pitch;

G. airbrake means on said fuselage afterbody component in association with said auxiliary pitch control means and including upper and lower braking panels adapted to lie flat-like against outer-directed control surfaces of the auxiliary pitch control means so as to form at least a portion of the effective control surfaces thereof when in retracted position;

means for moving said panels away from said pitch control means into the airstream passing over said fuselage afterbody component to create an air flow passage between the panels and the pitch control means when the airbrake means is to be deployed; and H. vertical translation means operatively connecting said braking panels with said auxiliary pitch control means for maintaining a substantially constant planar relation therebetween as the said airflow passage is varied during movement of the panels into and out of the airstream passing over said pitch control means, whereby laminar airflow is sustained over the control surfaces thereof to maintain the effectiveness of said pitch control means for aircraft trim and pitch control when the braking panels are so moved.

13. The fuselage of claim 12 in which means are provided for angularly deflecting said panels out of planar relation with said pitch control means axially of the fuselage to effect airbraking of the aircraft in flight.

14. The fuselage of claim 12 in which forward edges of said braking panels lie substantially at or rearward of the hinge line of said pitch control means when the panels are against the surface thereof to facilitate pivoting of the panels and pitch control means together as a unit for altering the trim or pitch of the aircraft.

* * * * *